(12) United States Patent
Hu (10) Patent No.: US 10,465,728 B2
(45) Date of Patent: Nov. 5, 2019

(54) CONNECTING STRUCTURE AND INFANT CARRIER THEREWITH

(71) Applicant: Wonderland Switzerland AG, Steinhausen (CH)

(72) Inventor: Jun-Jie Hu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 336 days.

(21) Appl. No.: 15/452,709

(22) Filed: Mar. 7, 2017

(65) Prior Publication Data

US 2017/0276157 A1 Sep. 28, 2017

(30) Foreign Application Priority Data

Mar. 22, 2016 (CN) .................... 2016 2 0228747 U (51) Int. Cl.
| | | |
|---|---|---|
| F16B 5/06 | (2006.01) | |
| A47D 1/00 | (2006.01) | |
| A47D 9/00 | (2006.01) | |
| A47D 13/06 | (2006.01) | |
| A47D 15/00 | (2006.01) | |

(52) U.S. Cl.
CPC .............. *F16B 5/0692* (2013.01); *A47D 1/00* (2013.01); *A47D 9/00* (2013.01); *A47D 13/06* (2013.01); *A47D 15/00* (2013.01); *B60Y 2200/83* (2013.01)

(58) Field of Classification Search
CPC ......... F16B 5/0692; A47D 15/00; A47D 9/00; A47D 1/00; A47D 13/06–068; B60Y 2200/83
See application file for complete search history.

(56) References Cited

U.S. PATENT DOCUMENTS

| | | | | |
|---|---|---|---|---|
| 4,710,049 A * | 12/1987 | Chang | .................. | A47D 13/063 16/250 |
| 5,966,784 A * | 10/1999 | Arbogast | ................ | B60R 22/48 24/633 |
| 6,721,971 B1 * | 4/2004 | Cheng | .................. | A47D 13/063 5/93.1 |
| 7,752,688 B2 * | 7/2010 | Chen | .................... | A47C 31/023 403/102 |
| RE43,919 E * | 1/2013 | Chen | ........................ | A47D 7/00 5/93.1 |
| 9,301,624 B2 * | 4/2016 | Rosenthal | ............ | A47D 13/063 |
| 9,840,168 B2 * | 12/2017 | Yi | ............................ | B62B 7/142 |
| 9,848,714 B2 * | 12/2017 | Burns | .................. | A47D 13/063 |
| 2005/0229308 A1 * | 10/2005 | Chen | .................... | A47D 13/063 5/93.1 |

(Continued)

*Primary Examiner* — Robert G Santos
*Assistant Examiner* — Myles A Throop
(74) *Attorney, Agent, or Firm* — Winston Hsu (57) ABSTRACT

A connecting structure adapted for an infant carrier includes a connecting hole portion and a connecting component. The connecting hole portion is disposed on a frame body of the infant carrier. The connecting component includes a first connecting portion and a second connecting portion. The first connecting portion is coupled onto a cloth cover of the infant carrier. The second connecting portion is connected to the first connecting portion and for connecting the connecting hole portion. Therefore, the connecting structure of the present invention can provide a convenient way to connect a cloth cover and a frame body of the infant carrier.

18 Claims, 6 Drawing Sheets

(56) References Cited

U.S. PATENT DOCUMENTS

| | | | |
|---|---|---|---|
| 2008/0115269 A1* | 5/2008 | Chen .................... | A47D 13/066 |
| | | | 5/99.1 |
| 2008/0235867 A1* | 10/2008 | Chen ....................... | A47D 7/02 |
| | | | 5/93.1 |
| 2009/0077775 A1* | 3/2009 | Burns ..................... | A47D 7/04 |
| | | | 24/386 |
| 2009/0144896 A1* | 6/2009 | Chen .................... | A47D 13/063 |
| | | | 5/93.1 |

* cited by examiner

CONNECTING STRUCTURE AND INFANT CARRIER THEREWITH

BACKGROUND OF THE INVENTION

1. Field of the Invention

The present invention relates to a connecting structure and an infant carrier therewith, and more particularly, to a connecting structure for connecting a cloth cover and a frame body of an infant carrier, and an infant carrier therewith.

2. Description of the Prior Art

An infant carrier, such as an infant crib or an infant stroller, usually includes a frame body composed of a plurality of rods connected to one another, and a cloth cover enclosing an exterior of the frame body. Currently, the cloth cover is fixed on the rods of the frame body by screws and washers. Therefore, there are through holes and screw holes formed on the cloth cover and the rods respectively. In such a way, the screws are allowed to pass through the through holes to engage with the screw holes for fixing the cloth cover onto the rods of the frame body. However, it is required to adjust a relative position of the cloth cover and the rods of the frame body to align through holes with the screw holes during an assembly process of the infant carrier after the cloth cover encloses the exterior of the frame body. Such assembly process is complicated and inefficient, which causes high manufacturing cost. Furthermore, screws and washers also affect aesthetic appearance of the infant carrier.

Therefore, there is a need to provide a convenient way to connecting a cloth cover and a frame body for not only simplifying an assembly process thereof and reducing manufacturing cost but also improving the aesthetic appearance of the infant carrier.

SUMMARY OF THE INVENTION

It is an objective of the present invention to a connecting structure for connecting a cloth cover and a frame body of an infant carrier, and an infant carrier therewith for solving aforementioned problems.

In order to achieve the aforementioned objective, the present invention discloses a connecting structure adapted for an infant carrier and for connecting a cloth cover and a frame body of the infant carrier. The connecting structure includes a connecting hole portion and a connecting component. The connecting hole portion is disposed on the frame body of the infant carrier. The connecting component includes a first connecting portion and a second connecting portion. The first connecting portion is coupled onto the cloth cover. The second connecting portion is connected to the first connecting portion and for connecting the connecting hole portion.

Preferably, the connecting hole portion is disposed on an end of the frame body of the infant carrier, and the second connecting portion stretches into the connecting hole portion and extends toward an interior of the frame body. The second connecting portion extending toward the interior of the frame body is formed in a hook shape. An end of the cloth cover and the frame body of the infant carrier can be connected by engagement of the hook-shaped second connecting portion and the connecting hole portion on the end of the frame body of the infant carrier. Furthermore, the hook-shaped second connecting portion also can cooperate with other components. For example, the second connecting portion can be covered by a wheel seat for preventing the second connecting portion from falling off. Another end of the cloth cover can be connected to the frame body of the infant carrier by the same connecting structure or another device, so as to secure a connection of the cloth cover and the frame body of the infant carrier reliably.

Specifically, the second connecting portion clamps the frame body of the infant carrier with the first connecting portion for enhancing reliability of the connection of the cloth cover and the frame body of the infant carrier. It prevents the cloth cover from separating from the frame body due to disengagement of the second connecting portion and the frame body during assembly of the cloth cover and the frame body.

Preferably, the first connecting portion is formed in a plate shape and arranged along a side wall of the frame body of the infant carrier. It not only provides a convenient way to connect the cloth cover and the connecting component but also prevents a relative displacement of the connecting component and the frame body.

Preferably, the first connecting portion is sewed onto the cloth cover.

Understandably, the first connecting portion and the second connecting portion are an integrally formed structure or two separated structures. No matter whether the first connecting portion and the second connecting portion are an integrally formed structure or two separated structures, the cloth cover and the frame body can be connected to each other quickly as long as the first connecting portion and the second connecting portion are connected reliably.

Preferably, the connecting structure further includes a third connecting portion, a positioning protrusion, and an engaging hole portion. The third connecting portion is located between the first connecting portion and the second connecting portion. The positioning protrusion protrudes from the third connecting portion and toward a side wall of the frame body of the infant carrier. The engaging hole portion is disposed on the frame body of the infant carrier and located at a position corresponding to the positioning protrusion for engaging with the positioning protrusion. Since the positioning protrusion and the second connecting portion restrain the cloth cover and the frame body along different directions at the same time, an end of the cloth cover coupled onto the connecting component and the frame body can be connected to each other by the connecting component only. No any other device is required.

Preferably, a through slot is formed on the third connecting portion. The third connecting portion includes a cantilever arm disposed inside the through slot. An end of the cantilever arm is connected to an inner wall of the through slot, and the positioning protrusion protrudes from the other end of the cantilever arm. The cantilever arm is made of resilient material, so as to be resiliently deformable. Therefore, the positioning protrusion located at the other end of the cantilever arm away from the end of the cantilever arm connected to the through slot is driven by a resilient recovering force of the cantilever arm to engage with the engaging hole portion when the connecting component is connected to the frame body.

Specifically, the connecting structure further includes an engaging block and an avoiding portion. The engaging block protrudes from a side of the positioning protrusion and along a direction perpendicular to the engaging hole portion. The avoiding portion is disposed on the frame body of the infant carrier and for receiving the engaging block. An extending direction of the engaging block is opposite to an extending direction of the second connecting portion. The engaging block and the second connecting portion are connected to the frame body along different directions, which enhances reliability of a connection of the connecting component and the frame body.

Specifically, the engaging block clamps an inner wall of the frame body for enhancing strength of a connection of the connecting component and the engaging hole portion.

Understandably, the first connecting portion, the second connecting portion, and the third connecting portion are an integrally formed structure or three separated structures. No matter whether the first connecting portion, the second connecting portion, and the third connecting portion are an integrally formed structure or three separated structures, the cloth cover and the frame body can be connected to each other quickly as long as the first connecting portion, the second connecting portion, and the third connecting portion are connected to one and another reliably.

In order to achieve the aforementioned objective, the present invention further discloses an infant carrier including a frame body, a cloth cover enclosing an exterior of the frame body, and a connecting structure for connecting the cloth cover and the frame body. The connecting structure includes a connecting hole portion disposed on the frame body and a connecting component. The connecting component includes a first connecting portion and a second connecting portion. The first connecting portion is coupled onto the cloth cover. The second connecting portion is connected to the first connecting portion and for connecting the connecting hole portion.

Preferably, the infant carrier is an infant crib, an infant stroller, or an infant seat.

Preferably, the frame body is a hollow pipe, and an end of the frame body is open.

In summary, the connecting structure of the present invention utilizes the first connecting portion for connecting the cloth cover and further utilizes the second connecting portion connected to the first connecting portion for connecting the connecting hole portion, so that the cloth cover and the frame body can be connected to each other quickly. Furthermore, by cooperation of the at least two connecting structures or of the connecting structure and other structure, the cloth cover and the frame body can be secured to each other reliably. Therefore, it has advantages of simple structure and easy operation, which simplifies an assembly process of the infant carrier and shorten assembly time. Moreover, since material and shape of the connecting component can be determined according to a style of the infant carrier, aesthetic appearance of the infant carrier can be improved effectively.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

Figure 1:
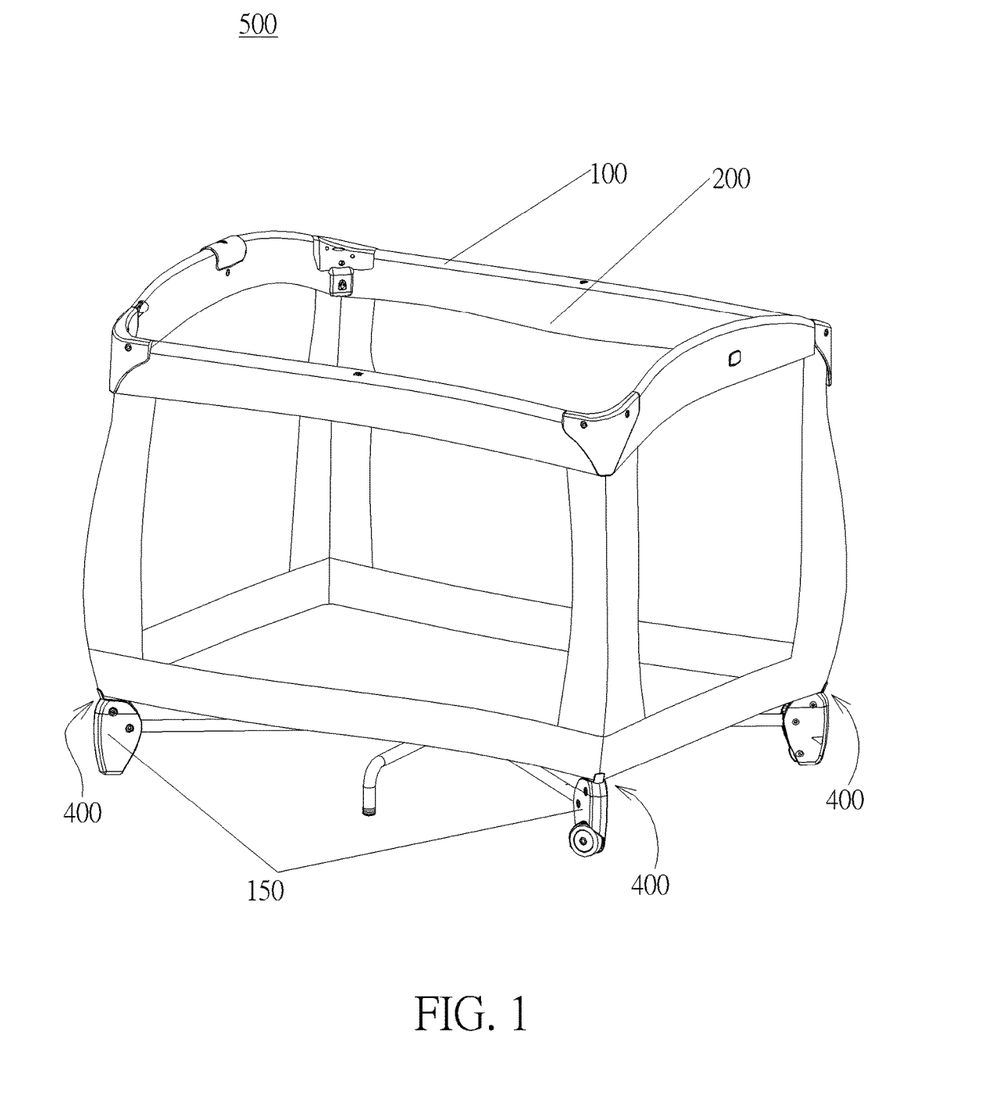
FIG. 1 is a schematic diagram of an infant carrier according to an embodiment of the present invention.
Figure 2:
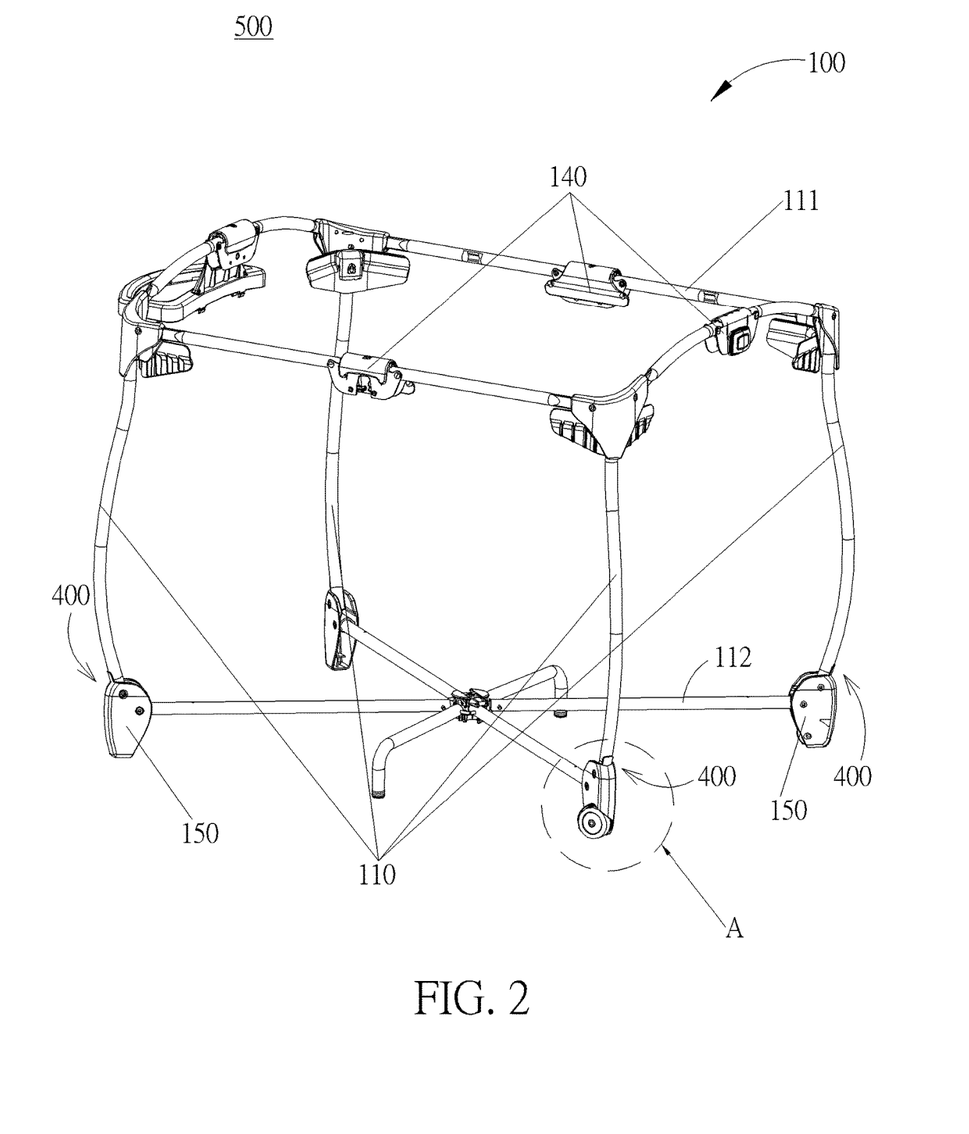
FIG. 2 is an internal diagram of the infant carrier according to the embodiment of the present invention.
Figure 3:
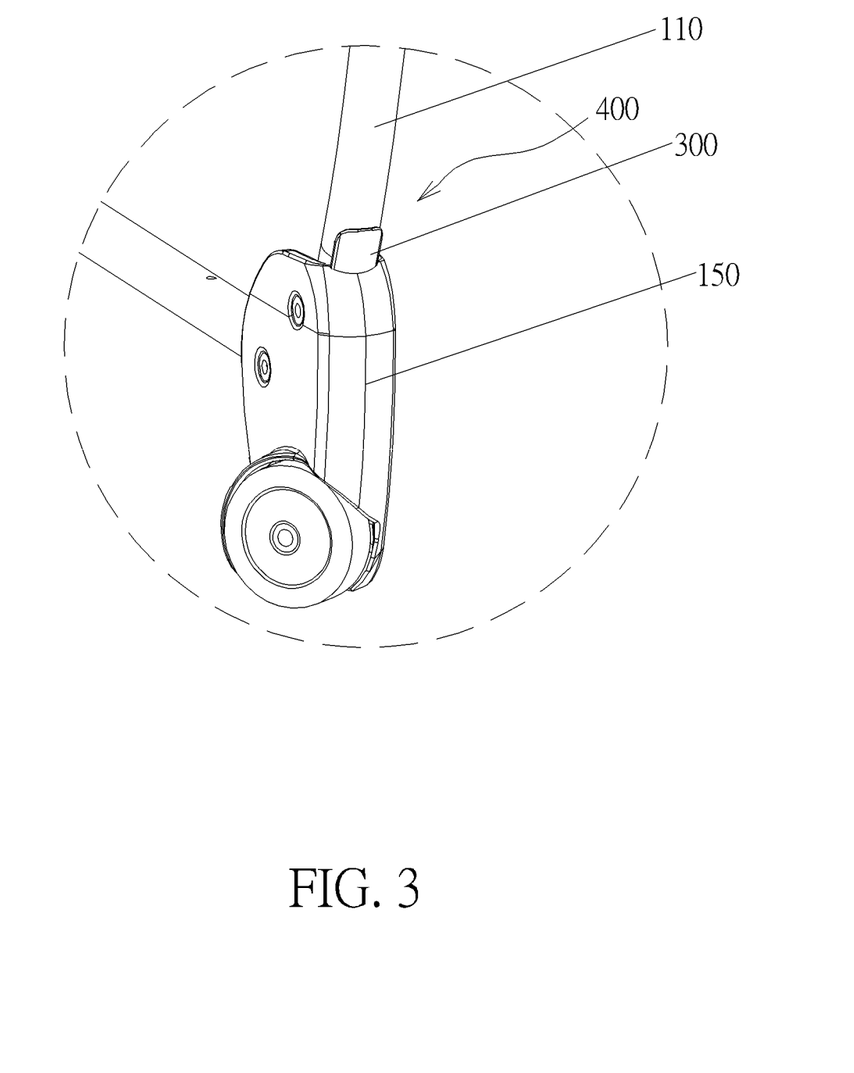
FIG. 3 is an enlarged diagram of an A portion of the infant carrier shown in FIG. 2 according to the embodiment of the present invention.
Figure 4:
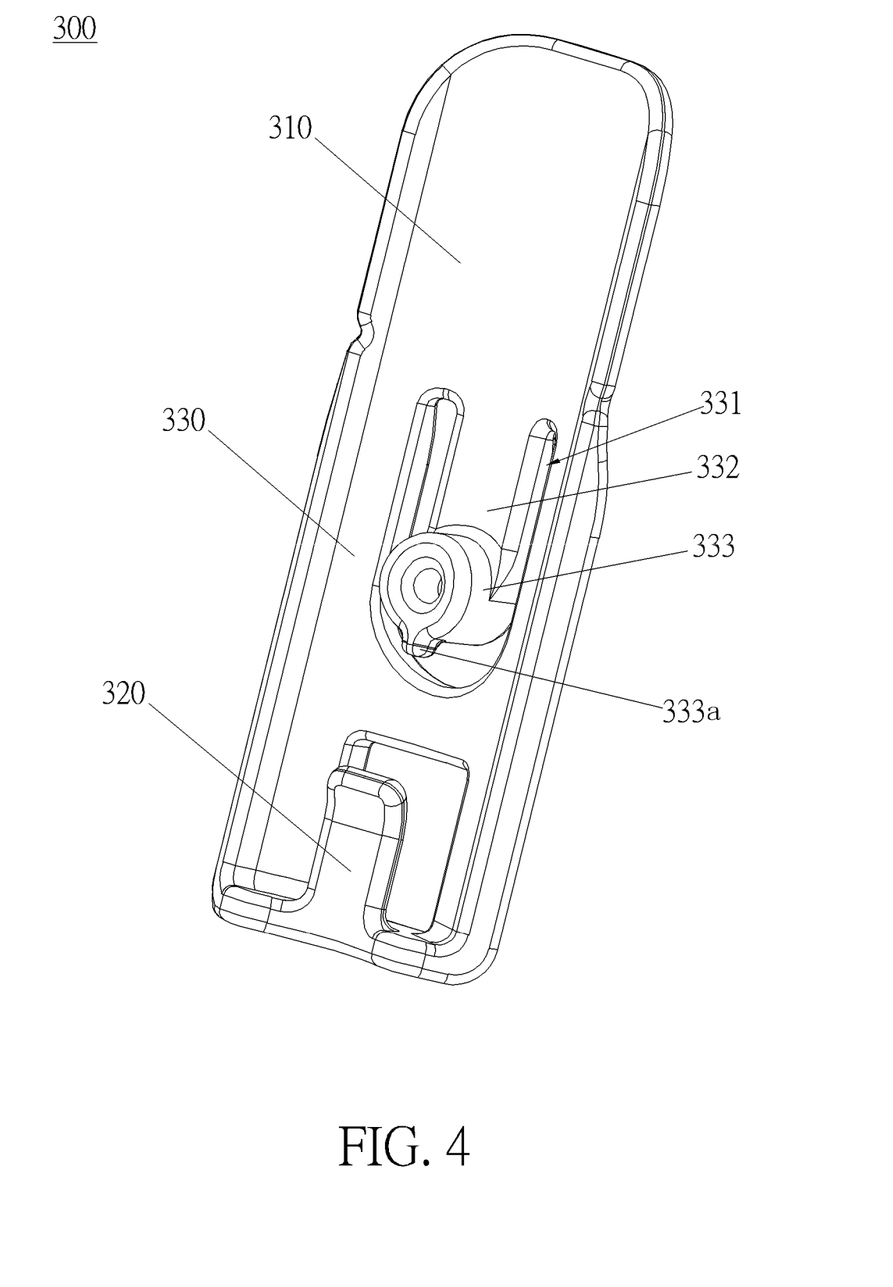
FIG. 4 is a diagram of a connecting component according to the embodiment of the present invention.
Figure 5:
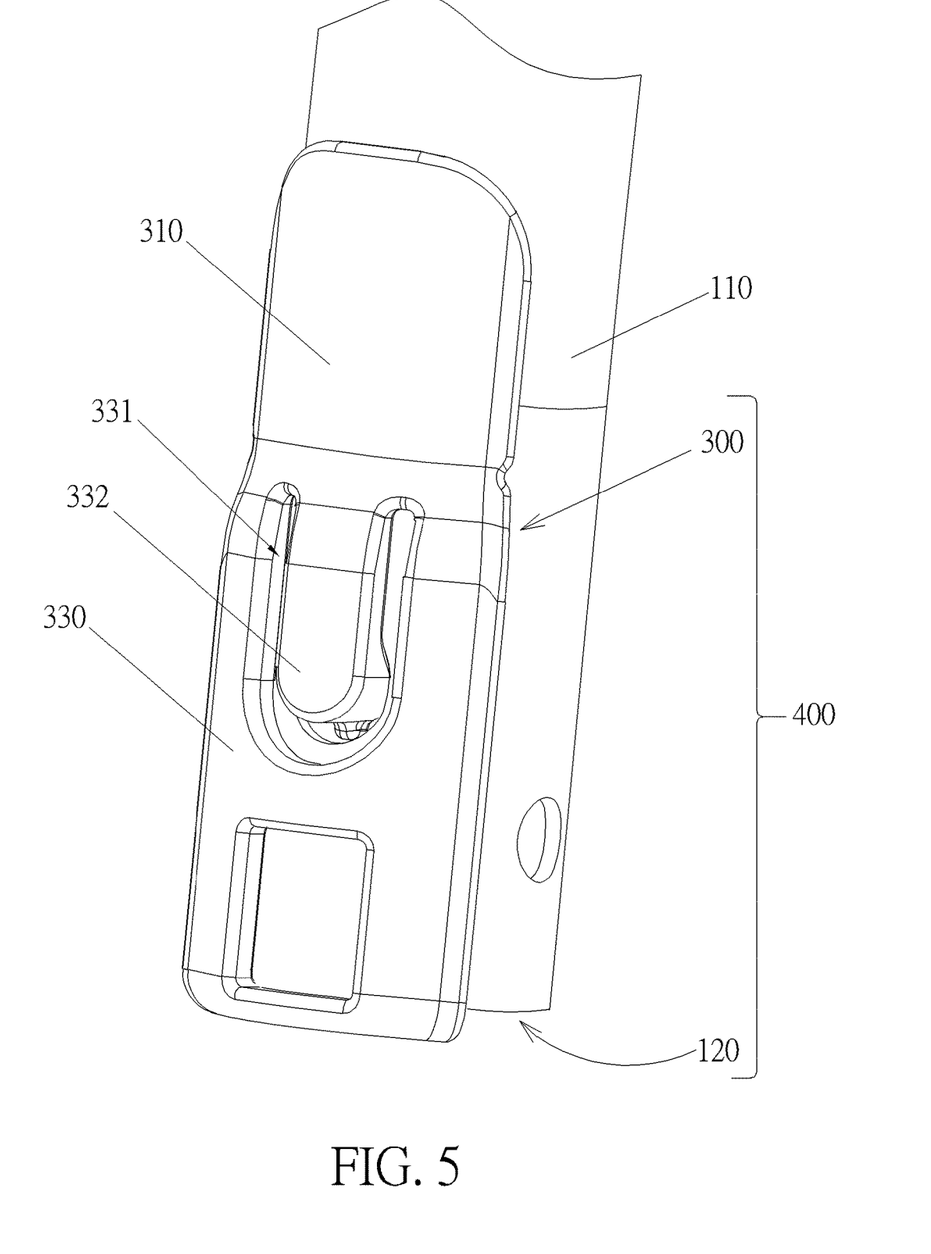
FIG. 5 is a diagram of a connecting structure and a frame body according to the embodiment of the present invention.
Figure 6:
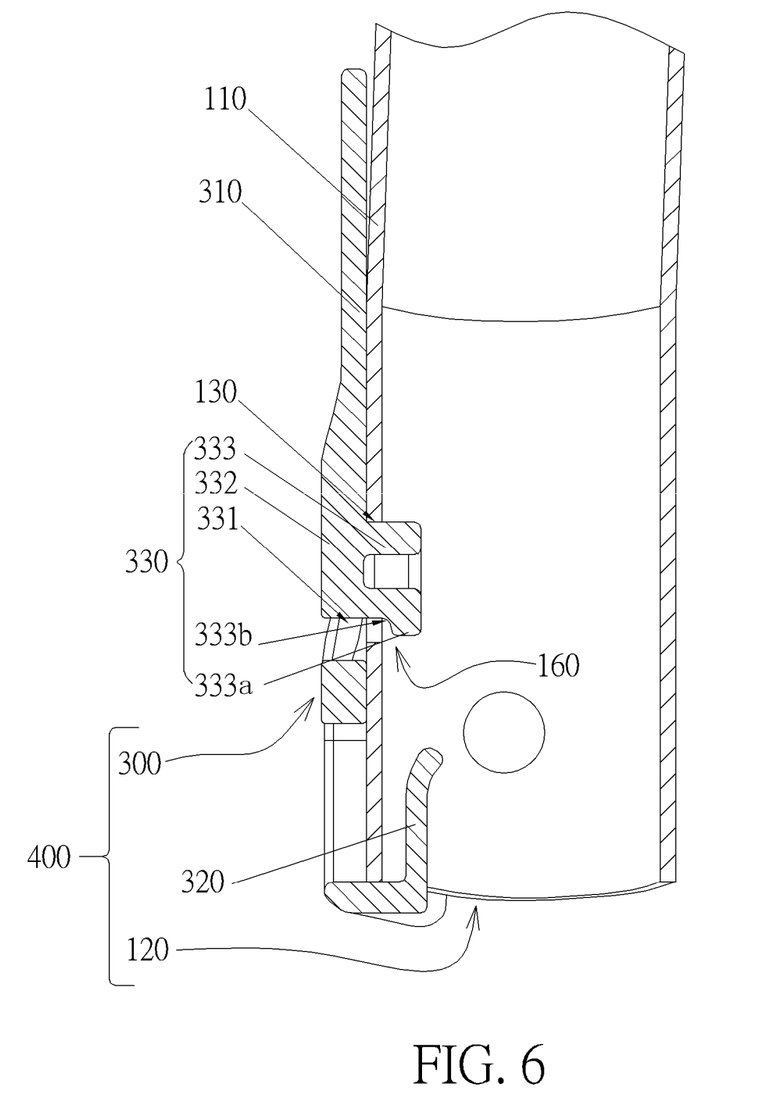
FIG. 6 is a sectional diagram of the connecting structure and the frame body according to the embodiment of the present invention.

Please refer to FIG. 1 to FIG. 6. FIG. 1 is a schematic diagram of an infant carrier 500 according to an embodiment of the present invention. FIG. 2 is an internal diagram of the infant carrier 500 according to the embodiment of the present invention. FIG. 3 is an enlarged diagram of an A portion of the infant carrier 500 shown in FIG. 2 according to the embodiment of the present invention. FIG. 4 is a diagram of a connecting component 300 according to the embodiment of the present invention. FIG. 5 is a diagram of a connecting structure 400 and a frame body 100 according to the embodiment of the present invention. FIG. 6 is a sectional diagram of the connecting structure 400 and the frame body 100 according to the embodiment of the present invention. As shown in FIG. 1 and FIG. 2, the infant carrier 500 includes the frame body 100, a cloth cover 200, four connecting structures 400, four clamping components 140, and four wheel seats 150. The frame body 100 includes a top rod 111, four vertical rods 110, and a bottom rod 112, which are connected to one and another, so as to define a substantially rectangular shape. The cloth cover 200 encloses an exterior of the frame body 100 of the infant carrier 500, so as to form an enclosed space within the rectangular shape, i.e., an accommodating space of the infant carrier 500.

Furthermore, in this embodiment, the infant carrier 500 can be an infant crib, and the frame body 100 can be an infant crib frame, as shown in FIG. 1. However, the infant carrier 500 is not limited thereto. For example, in another embodiment, the infant carrier 500 also can be an infant stroller or an infant seat, and the frame body 100 also can be an infant stroller frame or an infant seat frame.

As shown in FIG. 1 and FIG. 2, the four clamping components 140 are disposed on the top rod 111, and the four connecting structure 400 are disposed at lower ends of the four vertical rods 110, respectively. A top side of the cloth cover 200 is coupled onto the four clamping components 140. A bottom side of the cloth cover 200 is coupled on upper sides of the four connecting structures 400. The cloth cover 200 can be secured on the frame body 100 by cooperation of the four clamping components 140 and the four connecting structures 400. However, it is not limited to this embodiment. In another embodiment, the clamping component 140 can be omitted, and the connecting structure 400 can be disposed at any position relative to the cloth cover 200 and the frame body 100 as long as the connecting structure 400 and the frame body 100 can be connected to each other. It depends on practical demands.

Furthermore, in order to improve aesthetic appearance of the infant carrier 500, a residual portion of each of the four connecting structure 400, which is not coupled onto the cloth cover 200, is covered by the corresponding wheel seat 150 disposed on the lower end of the corresponding vertical rod 110, so that a connection of the connecting component 300 and the corresponding vertical rod 110 is completed hidden by the corresponding wheel seat 150. The wheel seat 150 covering the connecting component 300 also provides a function of restraining a displacement of the connecting component 300.

Specifically, each of the connecting structure 400 includes a connecting component 300 and a connecting hole portion 120 formed on frame body 100, which is shown in FIG. 6. The connecting component 300 includes a first connecting portion 310, a second connecting portion 320, and a third connecting portion 330. The first connecting portion 310 is connected to the second connecting portion 320 by the third connecting portion 330. In other words, the third connecting portion 330 is located between the first connecting portion 310 and the second connecting portion 320. The first connecting portion 310 is coupled onto the cloth cover 200. The second connecting portion 320 and the third connecting portion 330 are connected to the vertical rod 110 along different directions. Therefore, the frame body 100 and the cloth cover 200 can be connected to each other reliably.

Furthermore, in this embodiment, the first connecting portion 310, the second connecting portion 320, and the third connecting portion 330 can be an integrally formed structure. However, it is not limited to this embodiment. Understandably, in another embodiment, the first connecting portion 310, the second connecting portion 320, and the third connecting portion 330 can be three separated structures connected by fastening components, such as bolts, rivets, or by other engaging mechanisms.

More specifically, as shown in FIG. 1 to FIG. 4, the cloth cover 200 encloses the exterior of the frame body 100 and wraps the four vertical rods 110 of the frame body 100. The bottom side of the cloth cover 200 can be coupled onto an inner side or an outer side of the first connecting portion 310 by sewing or gluing. In this embodiment, the first connecting portion 310 can preferably be formed in a plate shape and arranged along a direction of a side wall of the vertical rod 110. The vertical rod 110 preferably can be a hollow pipe structure. Therefore, a connecting surface of the first connecting portion 310 corresponding to the vertical rod 110 can be formed in an arc shape.

Furthermore, the connecting hole portion 120 is disposed on a lower end of each of the four vertical rods 110. Each of the second connecting portions 320 stretches into the corresponding connecting hole portion 120 and extends toward an interior of the frame body 100. In this embodiment, the second connecting portion 320 can be formed in a hook shape. The hook-shaped second connecting portion 320 hooks the vertical rod 110 via the connecting hole portion 120 on the lower end of the vertical rod 110, which restrains a relative displacement of the vertical rod 110 and the cloth cover 200 along a direction.

Preferably, the second connecting portion 320 can clamp the vertical rod 110 of the frame body 100 with the first connecting portion 310, so as to enhance reliability of connection of the frame body 100 and the connecting component 300, which prevents the connecting component 300 from disengaging from the vertical rod 110 of the frame body 100 during an assembly process of the infant carrier 500.

Besides, as shown in FIG. 4 to FIG. 6, the third connecting portion 330 is located under the first connecting portion 310. A through slot 331 is formed on the third connecting portion 330. The third connecting portion 330 includes a cantilever arm 332 disposed inside the through slot 331. Preferably, in this embodiment, the through slot 331 is formed in a U shape, so as to form the cantilever arm 322. An end of the cantilever arm 332 is connected to an inner wall of the through slot 331. A positioning protrusion 333 protrudes from the other end of the cantilever arm 332. An engaging hole portion 130 is formed on the vertical rod 110 and located at a position corresponding to the positioning protrusion 333 for engaging with the positioning protrusion 333. The cantilever arm 332 can be made of resilient material, so as to be resiliently deformable. The positioning protrusion 333 located at the other end of the cantilever arm 332 away from the end of the cantilever arm 322 connected to the through slot 331 can be driven by a resilient recovering force of the cantilever arm 332 to engage with the engaging hole portion 130 when the connecting component 300 is connected to the vertical rod 110. By cooperation of the positioning protrusion 333 and the second connecting portion 320, the cloth cover 200 and the frame body 100 can be restrained along different directions. Therefore, the cloth cover 200 and the frame body 100 can be connected to each other only by the connecting component 300, and no any other component is required.

In another embodiment, in order to ensure strength of a connection of the positioning protrusion 333 and the engaging hole portion 130, a size of the positioning protrusion 333 can be configured to be greater than a size of the engaging hole portion 130 to provide an interference fit between the positioning protrusion 333 and the engaging hole portion 130, so as to enhance reliability of a connection of the third connecting portion 330 and the vertical rod 110 of the frame body 100.

In this embodiment, as shown in FIG. 4 and FIG. 6, an engaging block 333a protrudes from a side of the positioning protrusion 333 and along a direction perpendicular to the engaging hole portion 130. An avoiding portion 160 is formed on the vertical rod 110 for receiving the engaging block 333a. The engaging block 333a clamps an inner wall of the vertical rod 110, so as to enhance reliability of the connection of the third connecting portion 330 and the vertical rod 110. In other words, no matter whether there is an interference fit between the third connecting portion 330 and the vertical rod 110 or not, the third connecting portion 330 and the vertical rod 110 can be connected to each other reliably by the engaging block 333a.

Furthermore, the engaging block 333a and the second connecting portion 320 are disposed oppositely, and an extending direction of the engaging block 333a is opposite to an extending direction of the second connecting portion 320. Specifically, the engaging block 333a clamps the vertical rod 110 from the top down. The second connecting portion 320 clamps the vertical rod 110 from the bottom up. The connecting component 300 and the frame body 100 can be connected to each other reliably by cooperation of the engaging block 333a and the second connecting portion 320 disposed oppositely.

As mentioned above, in this embodiment, the vertical rod 110 preferably can be a hollow pipe, and the lower end of the vertical rod 110 can be open, as shown in FIG. 6. Understandably, both of the aforementioned connecting hole portion 120 for connecting with the second connecting portion 320, and the aforementioned avoiding portion 160 for receiving the engaging block 333a are two inner chambers formed on the pipe-shaped vertical rod 110.

Besides, as shown in FIG. 6, an arc-shaped transition surface 333b is disposed between the positioning protrusion 333 and a side of the engaging block 333a near the cantilever arm 332. The arc-shaped transition surface 333b facilitates a user to operate the connecting component 300 to disengage the third connecting portion 330 from the engaging hole portion 130 for disassembling the cloth cover 200 from the frame body 100.

Please refer to FIG. 1 to FIG. 6. An operational process of the connecting structure 400 is described as follows. The operational process of the connecting structure 400 includes the following steps. First, the four first connecting portions 310 can be sewed onto the bottom side of the cloth cover 200 according to positions of the four vertical rods 110, as shown in FIG. 4. Then, the exterior of the frame body 100 is enclosed with the cloth cover 200 after the frame body 100 has been assembled. Afterward, the relative position of the cloth cover 200 and the frame body 100 can be adjusted to locate the four connecting component 300 at positions close to the four vertical rods 110. Then, the second connecting portion 320 is inserted into the inner chamber of the vertical rod 100 via the connecting hole portion 120. At last, the positioning protrusion 333 can be engaged with the engaging hole portion 130 by the cantilever arm 332, so as to drive the engaging block 333a to clamp the inner wall of the vertical rod 110, as shown in FIG. 6.

However, structure of the connecting structure 400 is not limited to this embodiment. For example, in another embodiment, the third connecting portion 330 can be omitted. In other words, the connecting component 300 can only include the first connecting portion 310 coupled onto the cloth cover 200 and the second connecting portion 320 connected to the vertical rod 110 for connecting the cloth cover 200 and the vertical rod 110. Similarly, the first connecting portion 310 and the second connecting portion 320 can be an integrally formed structure or two separated structures. Operational principles of the first connecting portion 310 and the second connecting portion 320 are the same as the aforementioned one. Description is omitted herein for simplicity.

In contrast to the prior art, the connecting structure of the present invention utilizes the first connecting portion for connecting the cloth cover in advance and further utilizes the second connecting portion connected to the first connecting portion for connecting the connecting hole portion, so that the cloth cover and the frame body can be connected to each other quickly. Furthermore, by cooperation of the at least two connecting structures or of the connecting structure and other structure, the cloth cover and the frame body can be secured to each other reliably. Therefore, it has advantages of simple structure and easy operation, which simplifies the assembly process of the infant carrier and shortens assembly time. Moreover, since material and shape of the connecting component can be determined according to a style of the infant carrier, the aesthetic appearance of the infant carrier can be improved effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connecting structure adapted for an infant carrier and for connecting a cloth cover and a frame body of the infant carrier, the connecting structure comprising:
   a connecting hole portion disposed on the frame body of the infant carrier; and
   a connecting component comprising:
      a first connecting portion coupled onto the cloth cover;
      a second connecting portion connected to the first connecting portion and for connecting the connecting hole portion; and
      a third connecting portion located between the first connecting portion and the second connecting portion, a positioning protrusion protruding from the third connecting portion and toward a side wall of the frame body of the infant carrier, and an engaging hole portion being disposed on the frame body of the infant carrier and located at a position corresponding to the positioning protrusion for engaging with the positioning protrusion.

2. The connecting structure of claim 1, wherein the connecting hole portion is disposed on an end of the frame body of the infant carrier, and the second connecting portion stretches into the connecting hole portion and extends toward an interior of the frame body.

3. The connecting structure of claim 2, wherein the second connecting portion clamps the frame body of the infant carrier with the first connecting portion.

4. The connecting structure of claim 1, wherein the first connecting portion is formed in a plate shape and arranged along a side wall of the frame body of the infant carrier.

5. The connecting structure of claim 1, wherein the first connecting portion is sewed onto the cloth cover.

6. The connecting structure of claim 1, wherein the first connecting portion and the second connecting portion are an integrally formed structure or two separated structures.

7. The connecting structure of claim 1, wherein a through slot is formed on the third connecting portion, the third connecting portion comprises a cantilever arm disposed inside the through slot, an end of the cantilever arm is connected to an inner wall of the through slot, and the positioning protrusion protrudes from the other end of the cantilever arm.

8. The connecting structure of claim 1, further comprising an engaging block protruding from a side of the positioning protrusion and along a direction perpendicular to the engaging hole portion, and an avoiding portion disposed on the frame body of the infant carrier and for receiving the engaging block, wherein an extending direction of the engaging block is opposite to an extending direction of the second connecting portion.

9. The connecting structure of claim 8, wherein the engaging block clamps an inner wall of the frame body.

10. The connecting structure of claim 1, wherein the first connecting portion, the second connecting portion, and the third connecting portion are an integrally formed structure or three separated structures.

11. An infant carrier comprising:
   a frame body;
   a cloth cover enclosing an exterior of the frame body; and
   a connecting structure for connecting the cloth cover and the frame body, the connecting structure comprising:
      a connecting hole portion disposed on the frame body; and
      a connecting component comprising:
         a first connecting portion coupled onto the cloth cover;
         a second connecting portion connected to the first connecting portion and for connecting the connecting hole portion; and
         a third connecting portion located between the first connecting portion and the second connecting portion, a positioning protrusion protruding from the third connecting portion and toward a side wall of the frame body of the infant carrier, and an engaging hole portion being disposed on the frame body of the infant carrier and located at a position corresponding to the positioning protrusion for engaging with the positioning protrusion.

12. The infant carrier of claim 11, wherein the infant carrier is an infant crib, an infant stroller, or an infant seat.

13. The infant carrier of claim 11, wherein the connecting hole portion is disposed on an end of the frame body of the infant carrier, and the second connecting portion stretches into the connecting hole portion and extends toward an interior of the frame body.

14. The infant carrier of claim 11, wherein the first connecting portion is formed in a plate shape and arranged along a side wall of the frame body of the infant carrier.

15. The infant carrier of claim 11, wherein a through slot is formed on the third connecting portion, the third connecting portion comprises a cantilever arm disposed inside the through slot, an end of the cantilever arm is connected to an inner wall of the through slot, and the positioning protrusion protrudes from the other end of the cantilever arm.

16. The infant carrier of claim 11, wherein the connecting structure further comprises an engaging block protruding from a side of the positioning protrusion and along a direction perpendicular to the engaging hole portion, and an avoiding portion disposed on the frame body of the infant carrier and for receiving the engaging block, wherein an extending direction of the engaging block being opposite to an extending direction of the second connecting portion.

17. The infant carrier of claim 16, wherein the engaging block clamps an inner wall of the frame body.

18. The infant carrier of claim 11, wherein the frame body is a hollow pipe, and an end of the frame body is open.

* * * * *